United States Patent [19]
Borst

[11] 3,842,601
[45] Oct. 22, 1974

[54] LARGE LIQUID METAL VALVE ACTUATOR

[75] Inventor: Stephen Lyle Borst, Windsor Locks, Conn.

[73] Assignee: Combustion Engineering Inc., Windsor, Conn.

[22] Filed: Mar. 8, 1973

[21] Appl. No.: 339,266

[52] U.S. Cl.............. 60/326, 60/364, 251/59, 310/11, 417/50
[51] Int. Cl............... F15b 15/18, F15b 21/06
[58] Field of Search............. 60/326, 364; 417/50; 310/11; 308/9; 251/59

[56] References Cited
UNITED STATES PATENTS

| | | | |
|---|---|---|---|
| 2,616,448 | 11/1952 | Werey | 251/59 X |
| 2,645,136 | 7/1953 | Neal | 60/364 X |
| 2,658,454 | 11/1953 | Donelian | 417/50 |
| 2,730,951 | 1/1956 | Donelian et al. | 310/11 X |
| 2,934,900 | 5/1960 | Robinson | 60/326 X |
| 3,540,783 | 11/1970 | Cudnohufsky | 308/9 |
| 3,704,853 | 12/1972 | Waller | 251/59 |

*Primary Examiner*—Edgar W. Geoghegan
*Assistant Examiner*—William F. Woods
*Attorney, Agent, or Firm*—Stephen L. Borst

[57] ABSTRACT

A large valve actuator assembly driven by an electrically conducting liquid enclosed in a hermetically sealed housing. The conducting liquid contained within the housing is circulated by magnetic forces without housing penetrations. The circular flow of the liquid impinges on a vane structure causing it to rotate. The vane structure's rotation is mechanically translated from a rotary to a linear motion for valve stem actuation. The magnetic forces operate on principles of magnetic induction similar to those found in the operation of an electric motor. A circularly advancing magnetic field is imposed on the electrically conducting liquid. Magnetic coupling between the liquid and the advancing field causes the liquid to rotate and in so doing imparts rotation to the vane structure.

6 Claims, 2 Drawing Figures

LARGE LIQUID METAL VALVE ACTUATOR

BACKGROUND OF THE INVENTION

FIELD OF THE INVENTION

This invention relates to the generation of a mechanical displacement by an actuation mechanism which relies on the pumping characteristics of a liquid metal pump. More specifically, this invention may be used as a large valve actuator in a liquid sodium carrying system.

In the present invention a wave of magnetic field penetrates across and advances around the periphery of a disk of liquid metal. The magnetic field induces an instantaneous eddy current in the liquid metal in each position around the disk. The eddy current generates its own magnetic field which becomes magnetically coupled with the advancing field. Consequently, the magnetic coupling between the eddy current magnetic field and the advancing magnetic field drags the liquid around with the advancing magnetic field.

DESCRIPTION OF THE PRIOR ART

Linear motion with high forces with a liquid metal environment has heretofore been difficult to accomplish and is especially fraught with problems. This is particularly true for actuation of large valves used in liquid sodium systems incorporated in cooling nuclear reactors. In the reactor coolant context the traditional difficulties are aggravated and made more critical by the fact that the liquid sodium becomes radioactive. Second in importance to the radioactivity, the high temperatures and high corrosiveness of liquid sodium present the major difficulties. Also of concern is the fact that liquid sodium oxidizes explosively when allowed to come into contact with water and will burn when in contact with air. Standard means of valve sealing such as are used on valves that handle water are not acceptable since the liquid metal attacks all known packing materials. Therefore, an urgent need is felt to develop ways of handling liquid sodium which minimize the possibility of leakage from the liquid metal system.

In the prior art, two systems of valve actuation have been commonly used. The first incorporates a system which provides a thin annulus of sodium between the valve stem and valve body. The area where this annulus is located is then cooled below the solidification point of the sodium (208° F.) and the solidified sodium annulus becomes the valve packing. The major disadvantages of this system are that oxides of the sodium migrate to this cold area and form a very abrasive and solid joint which soon requires very large forces to shear the solid joint. The movement of the valve stem across the abrasive sodium oxide also causes damage to the valve stem. In addition, if the coolant which cools and solidifies the sodium annulus is lost, the annulus soon heats up to the point where the sodium melts and leakage from the system results. In a liquid sodium coolant system any leakage is unacceptable due to sodium's high corrosibility, radioactivity and its tendency to burn when in contact with air. The high temperatures of the reactor coolant (approaching 1,300° F. or 685° C.) add to the severity of the leakage problem since the pyrophoric qualities of sodium increase in direct relation to the temperature.

The second approach that is found in the prior art for valve actuation in a liquid metal system is a bellows arrangement. This approach is acceptable for small valves (valves with a maximum diameter of two inches), but becomes unacceptable for the large valves found in the reactor coolant circulation system (approaching twenty inches). An example of such a small bellows valve actuator is to be found in U.S. Pat. No. 2,948,118 entitled "Electromagnetic Pump Actuated Device." The bellows devices rely on thin membranes that must undergo considerable amounts of back and forth flexing. These thin flexing members are susceptible to fatigue and rupture causing leakage of the system's liquid. For the larger size valves, a considerable distance of travel is required and due to the large forces encountered, large diameters are required for the valve stems. Due to the large diameters, thicker bellows materials are required to withstand the pressure and very long stacks of bellows would be required to accommodate the motion without excessive stressing of the bellows materials.

In the liquid sodium system, certain impurities form and migrate to the cooler parts of the system. Ordinarily the bellows type valve actuator will be contained in a housing off to the side of the main flow of the system. The result is that the valve actuator runs at a lower temperature and sodium impurity concentration occurs. The concentrated impurities in the sodium tend to attack and embrittle the metallic components of the valve actuator further increasing the possibility of rupture of the thin membrane of the bellows.

SUMMARY OF THE INVENTION

This invention consists of an actuation means to be employed in an electrically conducting liquid environment. More specifically, the invention may be used as a valve actuator for controlling the positioning of a valve head in a hermetically sealed liquid metal system. A ball nut stem is reciprocated by a ball nut which in turn is attached to a disk which is caused to rotate by a system of vanes attached to the disk and suspended in the electrically conducting liquid. The valve stem, the ball nut, the valve structure and the electrically conducting liquid, which is the same as the liquid metal flowing in the regulated system, are all enclosed in a hermetically sealed housing. The driving force necessary to actuate this system is provided by magnets whose magnetic poles are all external to the sealed housing and which produce a rotating flux field in the electrically conducting liquid.

In this invention, the rotary motion of the liquid is produced by a moving magnetic field. A cup shaped housing with hollow walls contain the vane structure and the electrically conducting liquid within its hollow walls. A cylindrical magnet is inserted into the cylindrical space left by the cup shaped housing and is rotated in a clockwise or a counterclockwise direction. The magnetic field produced by the magnet penetrates the housing and causes eddy currents to be induced in the electrically conducting liquid. The eddy currents in turn set up their own fields which become linked with the rotating field. Thus, the rotating field magnetically couples with and drags along the electrically conducting liquid thereby causing the liquid to circulate. In so rotating, the liquid impinges on the blades of the vane structure causing it to rotate. By transforming the vane rotation into the reciprocation of a member, the desired actuation is obtained. Reversal of the direction of rotation of the magnet causes a reversal of rotation of the liquid and of the vane structure.

SUMMARY OF THE PREFERRED EMBODIMENTS

Figure 1:
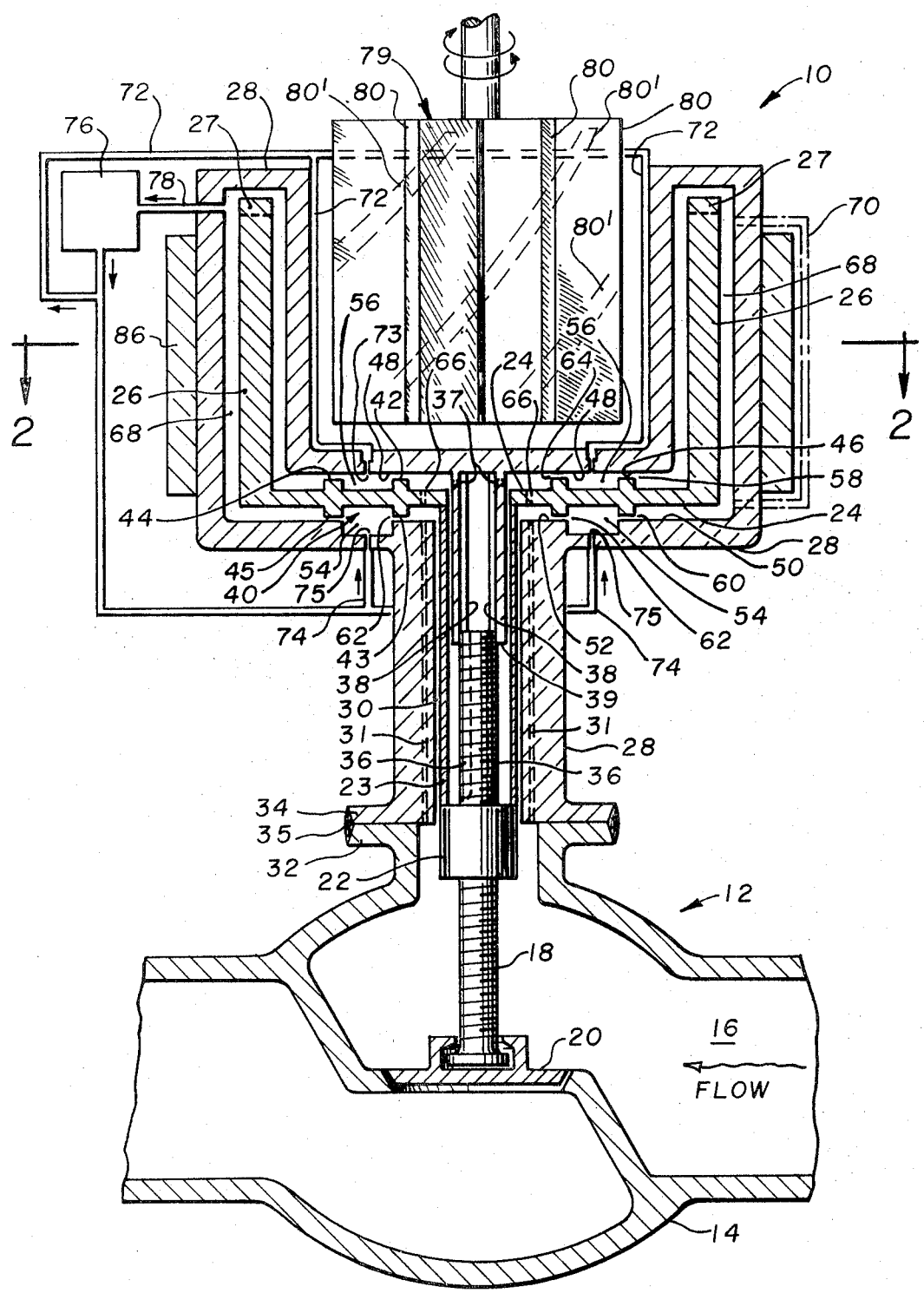
FIG. 1 is a cross-sectional diagram of a valve and valve actuator as described in the preferred embodiment.
Figure 2:
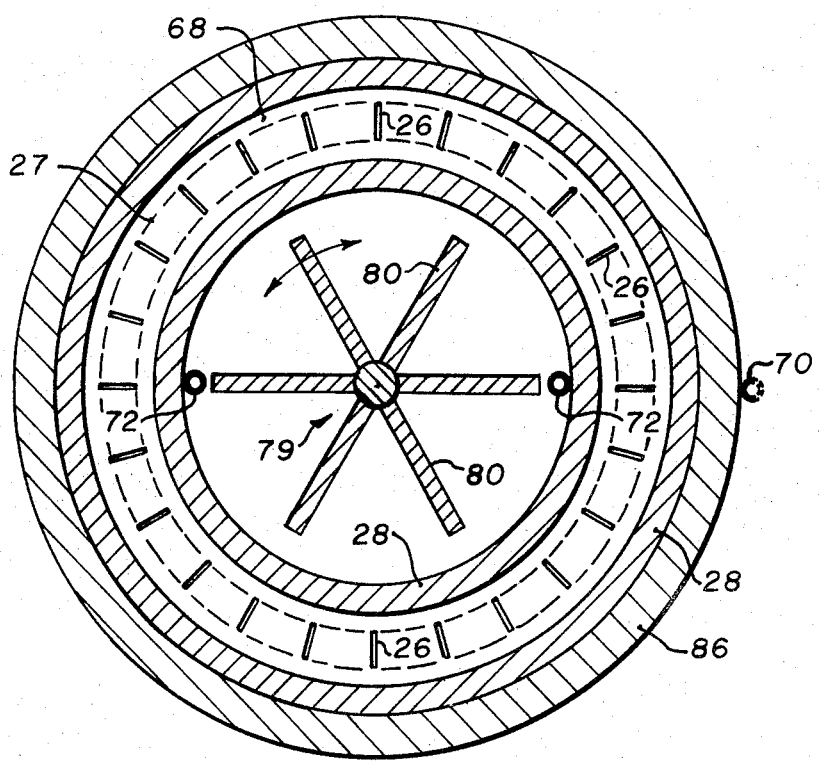
FIG. 2 is a plan view of the valve actuator's vane and magnet structures taken along the view lines 2—2 of FIG. 1.

This invention consists of an actuator assembly 10 as shown in FIG. 1. While the invention is particularly suited to valve actuation in a liquid sodium system, it is not intended herein that the scope of the invention be limited to use only with valve actuation in a liquid sodium system. It will be evident that the advantages of the invention have broad application to many other electrically conducting liquids and electrically conducting liquid handling systems whenever a reciprocating or rotating mechanism is desired.

In FIG. 1 the liquid handling system 12 contains a standard stainless steel valve body 14 through which the electrically conducting liquid 16 flows. The valve is operated by a ball screw shaft 18 which is substituted in place of the stem of the standard valve and which is attached to the valve head 20 by a means well known in the art. The shaft 18 is prevented from rotating by a spline and spline hub arrangement. The upper portion of shaft 18 is provided with key ways 36 adapted to slidably fit into a spline hub 39 provided with keys 38. The spline hub 39 is rigidly connected to the housing 28 of the valve actuator and is provided with fluid passages 37 to allow flow of fluid into and out from the interior of the spline hub 39. The shaft 18 is threaded through a low friction ball screw nut 22 which in turn is fastened by a cylindrical pipe 23 to a disk 24. This disk 24 provides the surfaces (lands) and depressions necessary for a hydrostatic bearing indicated generally as 40. The ball screw nut 22 is positioned by the cylindrical pipe 23 far enough away from the disk 24 to allow the shaft 18 sufficient vertical motion so that valve head 20 may be raised and lowered in order to achieve the desired opening and closing of the valve. At spaced intervals around the disk 24 are a series of orifices 66 for allowing the passage of fluid through the disk 24. At spaced intervals around the periphery of the disk 24 vanes 26 are attached to the disk 24 and lead upward perpendicularly from the plane of the disk 24. These vanes 26 may be connected by a supporting ring 27 at their extreme upper ends so that the disk 24, vane 26 and ring 27 configuration resembles a "squirrel cage" with one solid end (the disk 24).

The entire "squirrel cage" assembly is enclosed in a housing 28 which takes the shape of a cup with hollow sides and bottom. The housing 28 has an opening 30 which allows the passage of the shaft 18 and the cylindrical pipe 23. The housing 28 also has liquid passages 31 which allow liquid metal to flow from the system 12 into and out of the interior of housing 28. By providing a passage through the opening 31, the electrically conducting liquid 16 is allowed to continuously circulate through the housing 28 and thereby prevent the accumulation of impurities that have a tendency to migrate to the cooler parts of the system. An additional desirable feature is that the valve actuator 10 may be oriented in any direction. In fact, the entire valve body 14 and actuator assembly 10 may be mounted in the system 12 in such a way that the actuator assembly points down so that the housing 28 is self-venting and the accumulation of gases is prevented.

The housing 28 is attached to a flange 32 of the valve body 14 (from which the standard valve bonnet has been removed) by flange 34 formed at the base of housing 28. The surfaces of flanges 32 and 34 are sealed by welding 35 to insure a hermetically tight seal, thus completing a hermetically sealed unit which includes the housing 28, the valve body 14, and the fluid carrying system 12. In forming a hermetically sealed unit, one of the main objects of this invention is accomplished. All packing glands and bearing seals which are susceptible to leakage are eliminated thereby eliminating the leakage problem which it is so desirable to avoid in the liquid sodium system.

On the interior of the housing, the disk 24 is rotatably mounted by a self-balancing hydrostatic bearing 40. The bearing consists of lower and upper hydraulic cavities 54 and 56 formed by the disk 24 on the interior with raised inside circular races 42 and 43 on opposite sides of the disk and raised outside circular races 44 and 45 on opposite sides of the disk adjacent to and aligned with companion circular races 46, 48, 50 and 52 formed in the housing 28. The thickness of the hydrostatic bearing disk 24 is such that small gaps or orifices 58, 60, 62 and 64 are left between the races 42, 43, 44 and 45 of the disk 24 and the races 46, 48, 50 and 52 of the housing 28. By these gaps 58, 60, 62 and 64, positioned at the ends of the upper and lower hydraulic cavities 54 and 56, the lower and upper hydraulic cavities communicate with the fluid of the system and with the liquid cavities 68 in which the vanes 26 are positioned.

The hydraulic fluid cavities 54 and 56 are fed pressurized liquid sodium from an external electromagnetic pump 76 through supply tubes 72 and 74 which have restricted orifices 73 and 75. The electromagnetic pump 76 receives its supply of liquid sodium from one end of the liquid cavity 68 which can continuously replenish itself with liquid from the liquid sodium system 12 via passages 31, 62, 64, 58 and 60. The pump 76 may additionally have the characteristic of being able to be pulsed to facilitate the "start up" of the actuator 10. When the electromagnetic pump 76 is in operation, the disk 24 is caused to "float" in an equilibrium by the adjustment of pressures in cavities 54 and 56. If the disk moves away from the equilibrium position towards cavity 54, thus narrowing cavity 54, the orifices 60 and 62 are narrowed and the orifices 58 and 64 are widened. The widening of orifices 58 and 64 reduces the restriction of the flow out of cavity 56. The increased flow out of cavity 56 and the widening of cavity 56 with a fixed inlet flow tends to reduce the pressure cavity 56. At the same time, by narrowing orifices 60 and 62, thereby restricting the flow out of cavity 54 and by narrowing cavity 54, the pressure in cavity 54 is increased if a fixed inlet flow is maintained. As a result, the pressure in cavity 54 is greater than the pressure in cavity 56 and an unbalanced net force is created tending to lift the disk away from cavity 54 and toward cavity 56. This effect continues until the pressures in the two cavities 54 and 56 are again equalized and disk 24 has found its equilibrium position. The same type of restoring force is created if the disk 24 is displaced in the opposite direction. The net effect is that the disk "floats" in its equilibrium position so that when the disk is caused to rotate it always has a thin film of liquid on which to ride between pairs of races 42, 48 and 44, 46 and 43, 52 and 45, 50.

By examining the fluid flow within the housing 28, it can be seen that there is a continuous circulation and exchange of liquid throughout the actuator system 10. The electromagnetic pump 76 draws off liquid sodium from cavity 68. This liquid is replenished from the system 12 through passages 31 and passages 62, 64 and 58, 60. The pump 76 continuously circulates the liquid to cavities 54 and 56 through ducts 72 and 74.

This continuous circulation is an important factor in the operation of an actuator in a liquid sodium environment. Impurities within the liquid sodium system, namely those compounds of sodium which form by reacting with oxygen and hydrogen tend to migrate to the cooler parts of the system. When accumulation of the impurities occurs, detrimental effects are observed. The impurities formed with oxygen form hard deposits and consequently cause the fouling and eventual seizing of moving components. The impurities formed with hydrogen tend to embrittle the exposure components which leads to accelerated component failure. By providing circulation throughout the housing 28 and free exchange with the liquid sodium 16 of the system 12, the housing 28 is continuously flushed when the actuator is in operation. If the valve actuator is to remain in an inactive open position for a considerable time, the actuator may be periodically cycled from full-open to semi-open in order to provide the desired circulation and flushing action.

The rotation of the described actuator is accomplished through the rotation of the liquid sodium 16 which surrounds the vanes 26 in annular cavity 68. Rotational motion of the liquid sodium is achieved through the interaction of a circularly advancing magnetic field and the liquid sodium. The circularly advancing magnetic field is produced by the rotation in either direction of a cylindrical magnet 79 which is inserted into the inside of the cup formed by the vanes 26 and housing 28. This cylindrical magnet 79 has a plurality of pole faces 80 spaced around the perimeter of the cylinder and may either be a permanent or magnet or an electromagnet. By rotating the magnet, the magnetic fields of the poles 80 pass through the liquid sodium 16 which occupies the space 68. The housing 28 is clad by a magnetic material 86 which is of low magnetic reluctance and, therefore, provides a flux return path for the magnetic field. The rotationally advancing magnetic field induces eddy currents in the liquid sodium which in turn cause forces to be applied on the sodium which will make the sodium tend to follow the traveling magnetic field and cause a pressure to be exerted on the vanes 26 as the liquid metal tries to flow around them in the direction of travel of the advancing magnetic field.

In order for the magnetic field to penetrate through the housing 28 and through the conducting liquid 16, the housing 28 must be made from a material which is either magnetically permeable, very thin if not magnetically permeable, or a combination of both. Type 316 stainless steel is the material best suited for containing high temperature liquid sodium. Type 316 stainless steel is not particularly permeable so that the housing 28 in the vicinity of magnetic poles 80 should be quite thin, from 30 to 60 one-thousandth's of an inch in thickness. With such a thickness, the housing 28 must be clad with a magnetically permeable strengthening material such as series 400 stainless steel or any of the mild carbon steels. These intermediate layers of magnetically permeable material and the flux return material shell 86 provide a good magnetically conducting path for the magnetic field and permit penetration of the field across the liquid sodium in cavity 68.

Since sweeping the impurities out of the actuator housing is of considerable importance, additional means may be provided for insuring adequate circulation of the liquid in the actuator 10. This may be accomplished through slight modifications of the magnetic rotor 79 and the valve housing 28. The magnetic rotor 79 may be built with poles 82 which are helical (shown in FIG. 1 in dotted lines). Rotation of a magnetic rotor 79 with helical poles 82 produces a higher pressure at one end of the housing than at the other (depending on direction of pole tilt and on the direction of rotation of the rotor 79). By providing a liquid passage 70 (also shown in dotted lines) from the top of the housing 28 to some position lower on the housing 28, such as the bottom of the cupped housing 28, or even to the liquid handling system 12, the difference in pressure produced by the rotating helical poles 82 can be used to circulate the liquid through the actuator housing 28. This additional circulation, especially if liquid passage 70 is connected to the system 12, insures that all impurities contained in the liquid metal are swept from the actuator housing 28, thereby preventing their detrimental accumulation and malevolent effect. One further modification is necessary when the poles are helical. The liquid feed tubes 72 which feed the top of the hydrostatic bearing 40 must also be formed in a tilted or helical manner with the same angle of tilt and in the same direction as the tilted poles 82. If these feed tubes 72 were not angled or spiraled into the inside of the cup, then the same phenomenon of difference in pressure produced across the length of the feed tubes 72 by the rotating helical poles 82 would exist in the feed tubes and would impede or increase the supply of liquid to the hydrostatic bearing 40, thereby unbalancing it. This effect is prevented when the tubes 72 spiral into the cup at the same angle as the tilt of the poles 82.

It will be understood that the embodiment shown and described herein is merely illustrative and that changes may be made without departing from the scope of the invention as claimed.

What is claimed is:

1. An actuator assembly driven by an electrically conducting liquid, comprising:
   a. a housing having the shape of a hollow cup, thereby forming an interior void shaped like a cup and an exterior cylindrical cupped space;
   b. a vane assembly adapted to rotate within said interior cup shaped void with the vanes of said vane assembly adapted to rotate through the space in the hollow walls of said hollow cup shaped housing;
   c. means suspending said vane assembly within said cup shaped void for allowing low friction rotation of said vane assembly;
   d. power delivery means operably coupled to said vane assembly for utilizing said rotation;

e. a passage in said housing adapted to permit utilization of said rotation;

f. a passage in said housing adapted to permit the filling of said housing with said electrically conducting liquid so that said void is filled with said liquid; and g. a cylindrical rotor with a plurality of magnetic poles positioned on the cylindrical surface adapted to be inserted into and rotated in either direction with the cylindrical cupped shape formed by said cup shaped housing.

2. An actuator assembly driven by an electrically conducting liquid as recited in claim 1 wherein the extreme outside surface of said housing is clad with a low reluctance magnetic material.

3. An actuator assembly driven by an electrically conducting liquid as recited in claim 1 wherein the magnetic poles of said cylindrical rotor has poles which are longitudinally extended and which are oriented with their long dimension parallel to the axis of the cylinder.

4. An actuator assembly driven by an electrically conducting liquid as recited in claim 1 wherein said magnet includes helically shaped poles; and wherein said housing includes a passage means communicating with the interior of said housing and leading from the top of said housing to some bottom position of said housing for allowing circulation of said electrically conducting liquid.

5. An actuator assembly driven by an electrically conducting liquid as recited in claim 1 wherein said magnetic poles of said cylindrical rotor are poles of permanent magnets.

6. An actuator assembly driven by an electrically conducting liquid as recited in claim 1 wherein said poles of said cylindrical rotor are poles of electromagnets.

* * * * *

UNITED STATES PATENT OFFICE
CERTIFICATE OF CORRECTION

PATENT NO. : 3,842,601
DATED : October 22, 1974
INVENTOR(S) : Stephen L. Borst

It is certified that error appears in the above-identified patent and that said Letters Patent are hereby corrected as shown below:

| | |
|---|---|
| Column 1, line 25 | delete "with" after "forces" and substitute with --within--. |
| Column 3, line 23 | delete "whenever" and substitute with --wherever--. |
| Column 5, line 26 | delete "exposure" and substitute with --exposed--. |
| Column 7, line 10 | delete "shape" and substitute with --space--. And delete "with" and substitute with --within--. |

Signed and Sealed this twenty-first Day of October 1975

[SEAL]

Attest:

RUTH C. MASON
Attesting Officer

C. MARSHALL DANN
Commissioner of Patents and Trademarks